(12) United States Patent
Hsiao et al.

(10) Patent No.: US 10,461,631 B2
(45) Date of Patent: Oct. 29, 2019

(54) DC-TO-DC CONTROLLER AND CONTROL METHOD THEREOF

(71) Applicant: uPI Semiconductor Corp., Hsinchu County (TW)

(72) Inventors: Chih-Wen Hsiao, Hsinchu County (TW); Chih-Lien Chang, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 0 days.

(21) Appl. No.: 15/888,087

(22) Filed: Feb. 5, 2018

(65) Prior Publication Data

US 2018/0331619 A1    Nov. 15, 2018

(30) Foreign Application Priority Data

May 10, 2017 (TW) .............................. 106115408 A (51) Int. Cl.
*H02M 1/32* (2007.01)
*H02M 1/36* (2007.01)
*H02M 1/08* (2006.01)
*H02M 3/158* (2006.01)

(52) U.S. Cl.
CPC ............... *H02M 1/36* (2013.01); *H02M 1/08* (2013.01); *H02M 1/32* (2013.01); *H02M 3/158* (2013.01)

(58) Field of Classification Search
CPC ............ H02M 1/32; H02M 1/36; H02M 1/08; H02M 1/088; H02M 3/158; H02M 3/156; H02M 3/1588; H02M 3/335; H02M 3/33507; H02M 1/42; H02M 1/4225
See application file for complete search history.

(56) References Cited

U.S. PATENT DOCUMENTS

| | | |
|---|---|---|
| 6,343,025 B1 * | 1/2002 | Nagahara ................ H02M 1/32 363/16 |
| 7,576,522 B2 | 8/2009 | Chen et al. |
| 7,598,715 B1 | 10/2009 | Hariman et al. |
| RE43,538 E | 7/2012 | Solie et al. |
| 8,378,649 B2 | 2/2013 | Moussaoui |
| 8,669,748 B2 | 3/2014 | Ishii |
| 8,823,350 B2 | 9/2014 | Hsu et al. |
| 2008/0049465 A1 * | 2/2008 | Parto ...................... H02M 1/36 363/49 |
| 2011/0006746 A1 | 1/2011 | Lu et al. |
| 2011/0018515 A1 * | 1/2011 | McCloy-Stevens ........................ H02M 3/1588 323/284 |

(Continued)

*Primary Examiner* — Gustavo A Rosario-Benitez
(74) *Attorney, Agent, or Firm* — JCIPRNET (57) ABSTRACT

A DC-to-DC controller and a control method thereof are provided. The DC-to-DC controller couples to an output stage, and the output stage provides an output voltage and includes an upper bridge switch and a lower bridge switch. The DC-to-DC controller includes a time signal generating unit and a time signal control circuit. The time signal control circuit couples to the time signal generating unit and receives a preset voltage and the output voltage. During a soft start period, if the output voltage is lower than the preset voltage, after the upper bridge switch is turned off and before the upper bridge switch is turned on again, the time signal control circuit turns off the upper bridge switch and the lower bridge switch for a first preset time and turns on the lower bridge switch for a second preset time.

18 Claims, 7 Drawing Sheets

(56) References Cited

U.S. PATENT DOCUMENTS

| | | | |
|---|---|---|---|
| 2011/0109294 A1* | 5/2011 | Larson | H02M 1/36 323/285 |
| 2013/0176008 A1 | 7/2013 | Li et al. | |
| 2014/0218000 A1* | 8/2014 | Su | H02M 1/36 323/282 |
| 2015/0256088 A1* | 9/2015 | Ohtake | H02M 1/36 363/21.02 |
| 2015/0263602 A1* | 9/2015 | Drda | H02M 1/36 363/21.02 |
| 2017/0070149 A1* | 3/2017 | Guan | G05F 1/46 |

* cited by examiner

FIG. 8

DC-TO-DC CONTROLLER AND CONTROL METHOD THEREOF

CROSS-REFERENCE TO RELATED APPLICATION

This application claims the priority benefit of Taiwan application serial no. 106115408, filed on May 10, 2017. The entirety of the above-mentioned patent application is hereby incorporated by reference herein and made a part of this specification.

BACKGROUND OF THE INVENTION

1. Field of the Invention

The invention relates to a DC-to-DC controller, and particularly relates to a DC-to-DC controller and a control method thereof.

2. Description of Related Art

Figure 1:
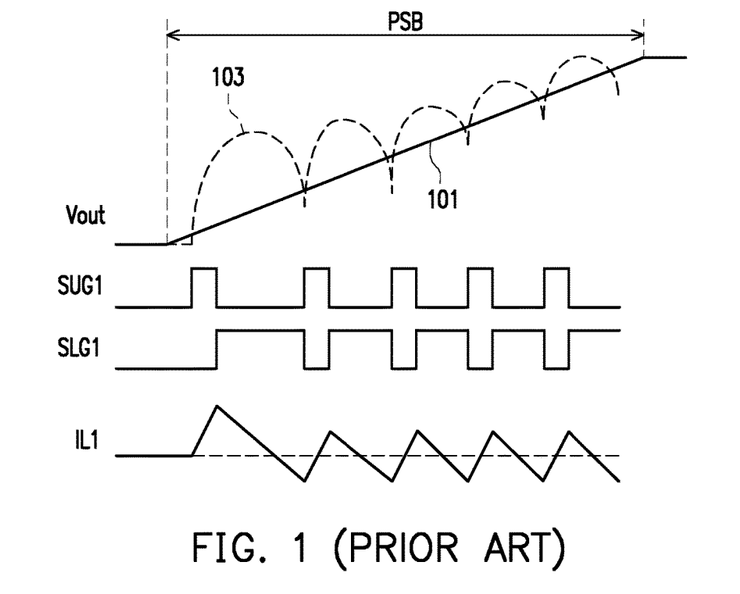
FIG. 1 is a schematic diagram illustrating a waveform of a conventional output stage.

FIG. 1 is a schematic diagram illustrating a waveform of a conventional DC-to-DC buck power converter. SUG1 and SLG1 respectively represent control signals of an upper bridge switch and a lower bridge switch. When the upper bridge switch is turned on, the lower bridge switch is turned off. At this time, an inductance current IL1 is in a direction of flowing toward an output end, and an output voltage Vout at the output end is increased. When the upper bridge switch is turned off, the lower bridge switch is turned on. At this time, the inductance current flows back toward a ground end. In other words, the inductance current IL1 becomes a voltage releasing current, and the output voltage Vout starts to decrease.

Since a voltage-increasing current of the output voltage is calculated by subtracting the output voltage from an input voltage and then dividing the result of subtraction by an inductance value at the output end, the voltage releasing current is a result of dividing the output voltage by the inductance value at the output end. At an initial stage of a soft start period PSB of a power conversion circuit, since the output voltage is low, the ability of voltage releasing is still weak. Therefore, an output curve 103 at the initial stage of the soft start period PSB is much higher than a slew rate 101. Consequently, the output at the soft start period of the system becomes unstable. Especially, when the input voltage is higher and the slew rate is lower.

SUMMARY OF THE INVENTION

The invention provides a DC-to-DC controller and a control method thereof capable of stabilizing an output at an initial stage of a soft start period.

A DC-to-DC controller according to an embodiment of the invention is coupled to an output stage, and the output stage provides an output voltage and includes an upper bridge switch and a lower bridge switch. The DC-to-DC controller includes a time signal generating unit and a time signal control circuit. The time signal control circuit couples to the time signal generating unit and receives a preset voltage and the output voltage. During a soft start period, if the output voltage is lower than the preset voltage, after the upper bridge switch is turned off and before the upper bridge switch is turned on again, the time signal control circuit turns off the upper bridge switch and the lower bridge switch for a first preset time and turns on the lower bridge switch for a second preset time.

A DC-to-DC controller according to an embodiment of the invention is coupled to an output stage, and the output stage provides an output voltage and includes an upper bridge switch and a lower bridge switch. The DC-to-DC controller includes a time signal generating unit and a time signal control circuit. The time signal control circuit couples to the time signal generating unit and receives a preset voltage and the output voltage. During a soft start period, if the output voltage is lower than the preset voltage, the time signal control circuit controls that the upper bridge switch and the lower bridge switch with a preset period of dead time during each operation cycle period. During each operation cycle period, each of the upper bridge switch and the lower bridge switch is turned on once.

A control method of a DC-to-DC controller for controlling an upper bridge switch and a lower bridge switch of an output stage according to an embodiment of the invention includes the following: providing a time signal; providing a switch signal based on a preset condition to switch between an initial mode and a normal mode during a soft start period of the DC-to-DC controller. In the initial mode, a turn-on period of the lower bridge switch is set as a minimum-on-time, and the upper bridge switch and the lower bridge switch are turned off for a first preset time after the upper bridge switch is turned off and before the upper bridge switch is turned on again. And, in the normal mode, the upper bridge switch and the lower bridge switch operate based on the time signal.

Based on the above, in the DC-to-DC controller and the control method thereof according to the embodiments of the invention, after the upper bridge switch of the output stage is turned off and before the upper bridge switch is turned on again, the lower bridge switch of the output stage is turned on at least once. Accordingly, voltage releasing of the output voltage is facilitated through the body diode of the lower bridge switch to prevent overshoot.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
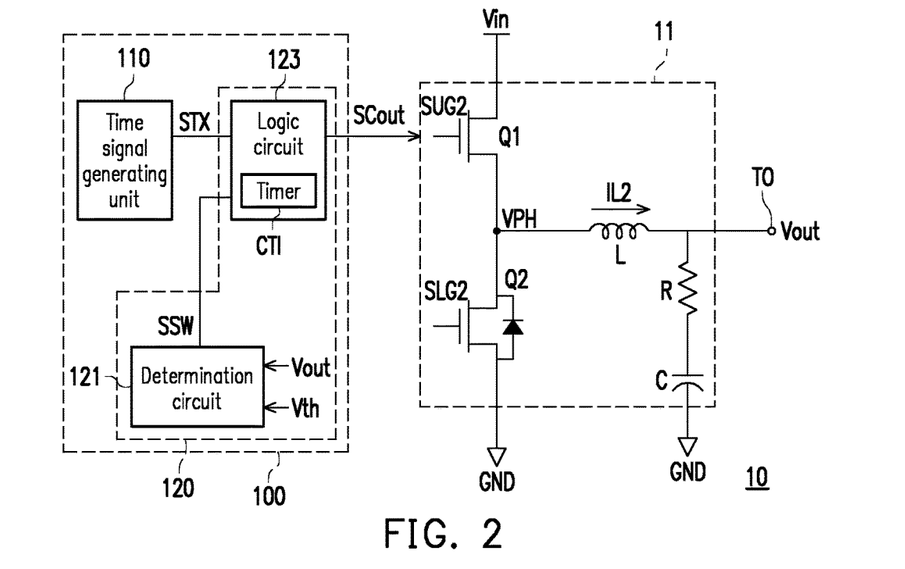
FIG. 2 is a schematic view illustrating a DC-to-DC power converter according to an embodiment of the invention.

FIG. 2 is a schematic view illustrating a power converter according to an embodiment of the invention. Referring to FIG. 2, in the embodiment, a DC-to-DC power converter 10 includes an output stage 11 and a DC-to-DC controller 100. The output stage 11 includes an upper bridge switch Q1 (such as a power transistor), a lower bridge switch Q2 (such as a power transistor), an inductor L, a resistor R, and a capacitor C. An end of the upper bridge switch Q1 receives an input voltage Vin, a gate of the upper bridge switch Q1 receives an upper bridge control signal SUG2, and a phase voltage VPH is provided between the upper bridge switch Q1 and the lower bridge switch Q2. An end of the lower bridge switch Q2 is coupled to the upper bridge switch Q1, a gate of the lower bridge switch Q2 receives a lower bridge control signal SLG2, and another end of the lower bridge switch Q2 is coupled to a ground end GND.

The DC-to-DC controller 100 includes a time signal generating unit 110 and a time signal control circuit 120. The time signal generating circuit 120 includes a determination circuit 121 and a logic circuit 123. The time signal generating circuit 110 provides a time signal STX. During a soft start period, the determination circuit 121 provides a switch signal SSW based on a preset condition to switch between an initial mode and a normal mode. In the embodiment, the determination circuit 121 receives the output voltage Vout and a preset voltage Vth to determine whether the output voltage Vout is lower than the preset voltage Vth (e.g., 0.2 volts (V)) and correspondingly provide the switch signal SSW. In the embodiment, the determination circuit 121 is a comparator. However, in other embodiments, the determination circuit 121 may be other logic circuits or formed by other circuits.

The logic circuit 123 is coupled to the time signal generating circuit 110, the determination circuit 121, and the output stage 11, and receives the time signal STX and the switch signal SSW. The logic circuit 123 provides a control signal SCout to the output stage 11 based on the time signal STX and the switch signal SSW to control relevant operations of the output stage 11.

Figure 3A:
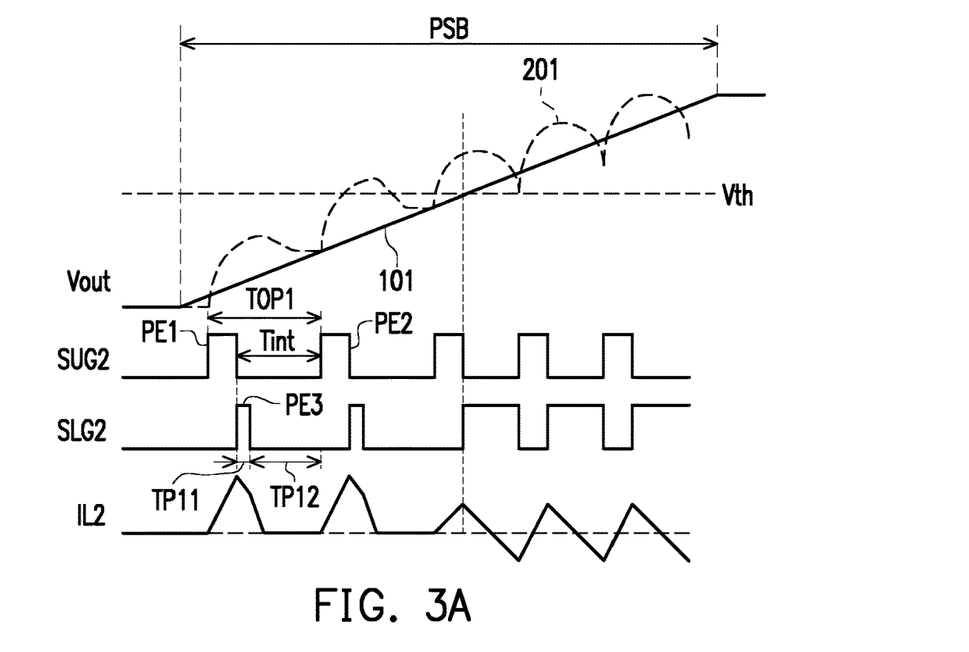
FIGS. 3A and 3B are schematic diagrams illustrating waveforms of a DC-to-DC power converter according to an embodiment of the invention.
Figure 3B:
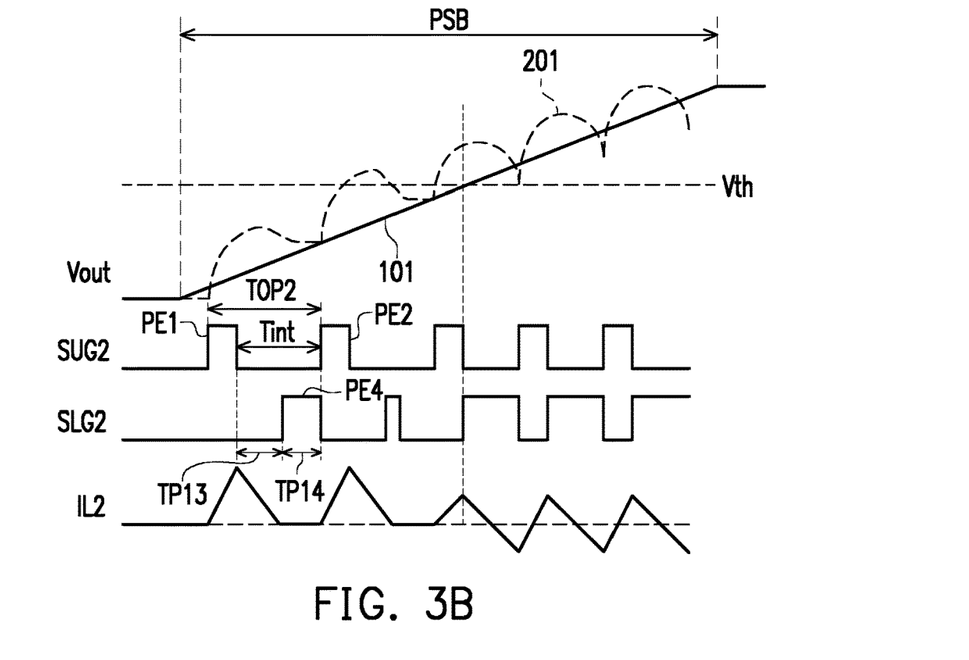

FIGS. 3A and 3B are schematic diagrams illustrating waveforms of a DC-to-DC power converter according to an embodiment of the invention. Referring to FIGS. 2 and 3A, in the embodiment, a curve 201 illustrates a waveform of the output voltage Vout, and a curve 101 illustrates a slew rate curve during a soft start period PSB. During an operation cycle period TOP1, each of the upper bridge switch Q1 and the lower bridge switch Q2 is turned on once. During the soft start period PSB, when the output voltage Vout is lower than the preset voltage Vth, the determination circuit 121 outputs the switch signal SSW to set that the DC-to-DC controller 100 is in the initial mode.

When the DC-to-DC controller 100 is in the initial mode, the time signal control circuit 120 performs the following. During a period of interval time (e.g., an interval time Tint) between two adjacent turn-on periods (e.g., turn-on periods PE1 and PE2) of the upper bridge switch Q1, namely during a turn-off period of the upper bridge switch Q1, the lower bridge switch Q2 is turned on first (e.g., a turn-on period PE3), and a time duration of the turn-on period of the lower bridge switch Q2 is TP11 (corresponding to a second preset time). Then, during the interval time Tint, a time duration of a turn-off period of the lower bridge switch Q2 is TP12 (corresponding to a first preset time). The time duration TP11 may be set as the minimum-on-time that the time signal generating circuit 110 is able to provide. In addition, during a period corresponding to the time duration TP12, the upper bridge switch Q1 and the lower bridge switch Q2 are turned off. Therefore, a time period corresponding to the time duration TP12 may be considered as a preset period of dead time. In other words, a dead time is provided during the operation cycle period TOP1.

Namely, when the output voltage Vout is lower than the preset voltage Vth, after the upper bridge switch Q1 is turned off and before the upper bridge switch Q1 is turned on again, the time signal control circuit 123 turns on the lower bridge switch Q2 for the time duration TP11 immediately after the upper bridge switch Q1 is turned off, and then turns off the upper bridge switch Q1 and the lower bridge switch Q2 for the time duration TP12. Hence, the dead time (a period corresponding to the time duration TP12) is immediately after the lower bridge switch Q2 is turned off.

Accordingly, when the upper bridge switch Q1 is turned off, the lower bridge switch Q2 is turned on for a short period of time (e.g., 300 nanoseconds (ns) to 500 nanoseconds). Then the lower bridge switch Q2 is turned off. Since the inductor L is in a positive current, a body diode of the lower bridge switch Q2 is turned on, and the phase voltage VPH is −0.7V, a voltage releasing capability is (Vout+0.7)/L. Accordingly, voltage releasing is facilitated without overshoot.

In an embodiment, the DC-to-DC controller 100 is capable of over current protection (OCP). Since an inductor current IL2 is not detectable during the turn-off period of the lower bridge switch Q2, and the lower bridge switch Q2 is completely turned off in the conventional art, over current protection of the DC-to-DC controller 100 is unable to function under the circumstance. Thus, if an over current occurs during the turn-off period of the lower bridge switch Q2, the power converter may be damaged. In the embodiment of the invention, the lower bridge switch Q2 is turned on for a short period of time. During the short period of time, over current protection is able to function normally. Therefore, the damage caused by an over current can be prevented.

In addition, when the output voltage Vout is higher than the preset voltage Vth, the determination circuit 121 outputs the switch signal SSW to switch the DC-to-DC controller 100 to the normal mode. When the DC-to-DC controller 100 is in the normal mode, the time signal control circuit 123 may operate the upper bridge switch Q1 and the lower bridge switch Q2 normally. For example, the upper bridge switch Q1 and the lower bridge switch Q2 are turned on alternately based on the time signal STX. In addition, a time duration of a single turn-on period of the lower bridge switch Q2 is equal to a time duration of a single turn-off period of the upper bridge switch Q1 (i.e., the interval time Tint).

Referring to FIGS. 3A and 3B, similarly, during the operation cycle period TOP2, each of the upper bridge switch Q1 and the lower bridge switch Q2 is turned on once. In FIG. 3A, the turn-on period (e.g., the turn-on period PE3) of the lower bridge switch Q2 may immediately follow an earlier turn-on period (e.g., the turn-on period PE1) of two adjacent turn-on periods of the upper bridge switch Q1. However, in FIG. 3B, there is a dead time between the turn-on period (e.g., the turn-on period PE4) of the lower bridge switch Q2 and the earlier turn-on period (e.g., the turn-on period PE1) of two adjacent turn-on periods of the upper bridge switch Q1. A time duration TP14 may be set as the minimum-on-time that the time signal generating circuit 110 is able to provide. In addition, during a period corresponding to a time duration TP13, the upper bridge switch Q1 and the lower bridge switch Q2 are turned off. Therefore, a time period corresponding to the time duration TP13 may be considered as a preset period of dead time. In other words, there is also a dead time during the operation cycle period TOP2.

When the output voltage Vout is lower than the preset voltage Vth, after the upper bridge switch Q1 is turned off and before the upper bridge switch Q1 is turned on again, the time signal control circuit 120 turns off the upper bridge switch Q1 and the lower bridge switch Q2 for the time duration TP13 (corresponding to the first preset time) after the upper bridge switch Q1 is turned off, and then turns on the lower bridge switch Q2 for a time duration TP14 (corresponding to the second preset time). Namely, the dead time (a period corresponding to the time duration TP13) is immediately after the upper bridge switch Q1 is turned off.

In the embodiment, during the soft start period PSB, a timer CTI may be embedded in the logic circuit 123 to set the dead time (e.g., 1 microsecond). Taking the embodiment of FIG. 3A as an example, when the lower bridge switch Q2 is turned off, the timer CTI turns on the upper bridge switch Q1 after the dead time. In the case of the embodiment of FIG. 3B, after the upper bridge switch Q1 is turned off, the timer CTI may turn on the lower bridge switch Q2 after the dead time. In the embodiment, the timer CTI may be implemented to be a delay circuit.

Figure 4A:
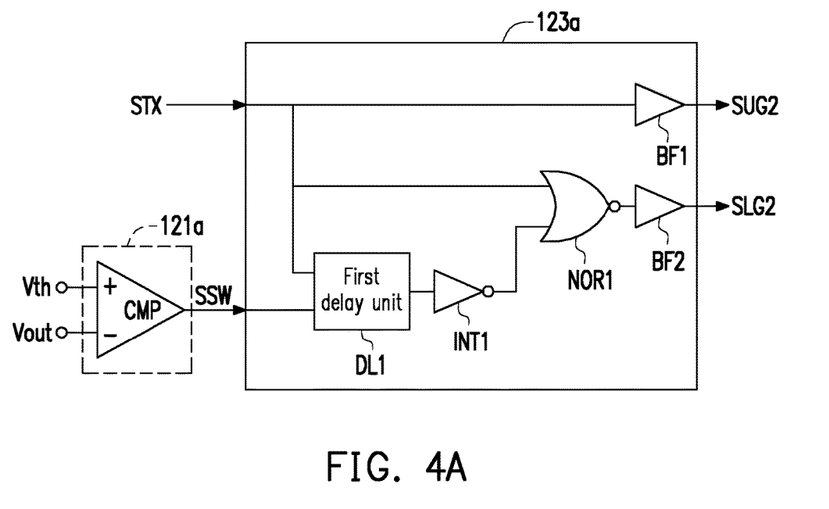
FIG. 4A is a schematic view illustrating a time signal control circuit according to an embodiment of the invention.

FIG. 4A is a schematic view illustrating a time signal control circuit according to an embodiment of the invention. Referring to FIGS. 2 and 4A, in the embodiment, a determination circuit 121a is a comparator CMP. An input end of the comparator CMP receives the preset voltage Vth, another input end of the comparator CMP receives the output voltage Vout, and an output end of the comparator CMP provides the switch signal SSW. The logic circuit 123 includes a buffer BF1, a buffer BF2, a delay unit DL1, an inverter INT1, and an NOR gate NOR1. The logic circuit 123a provides the upper bridge control signal SUG2 and the lower bridge control signal SLG2 to the upper bridge switch Q1 and the lower bridge switch Q2 based on the time signal STX and the switch signal SSW.

Figure 4B:
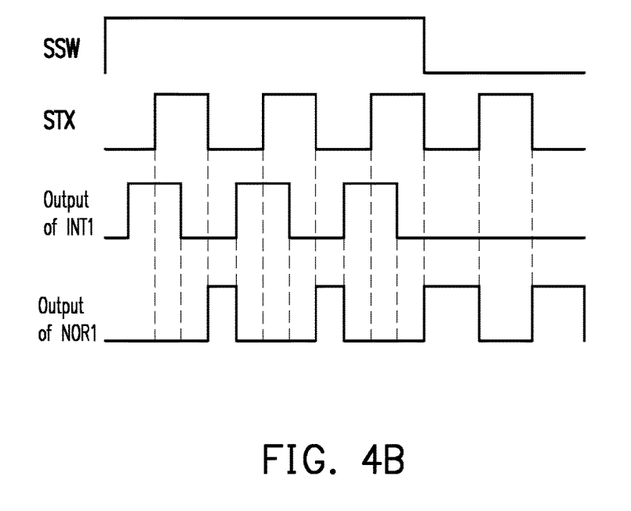
FIG. 4B is a waveform diagram of a time signal control circuit according to an embodiment of the invention.

Referring to FIGS. 4A and 4B, in a period of the initial mode, the switch signal SSW enables the delay unit DL1 to delay the time signal STX. During a period when the upper bridge control signal SUG2 is at a low level, the delayed time signal STX is inverter by the inverter INT1. The NOR gate NOR1 receives the time signal STX and the delayed and inverted time signal STX. When the time signal STX and the delayed and inverted time signal STX are at a low level, the lower bridge control signal SLG2 at a high level is transmitted. During a period of the normal mode, the switch signal SSW disables the delay unit DL1. In other words, the NOR gate NOR1 only receives the time signal STX and a signal constantly at a low level. Under the circumstance, the NOR gate NOR1 transmits an inverted signal of the time signal STX.

Figure 5A:
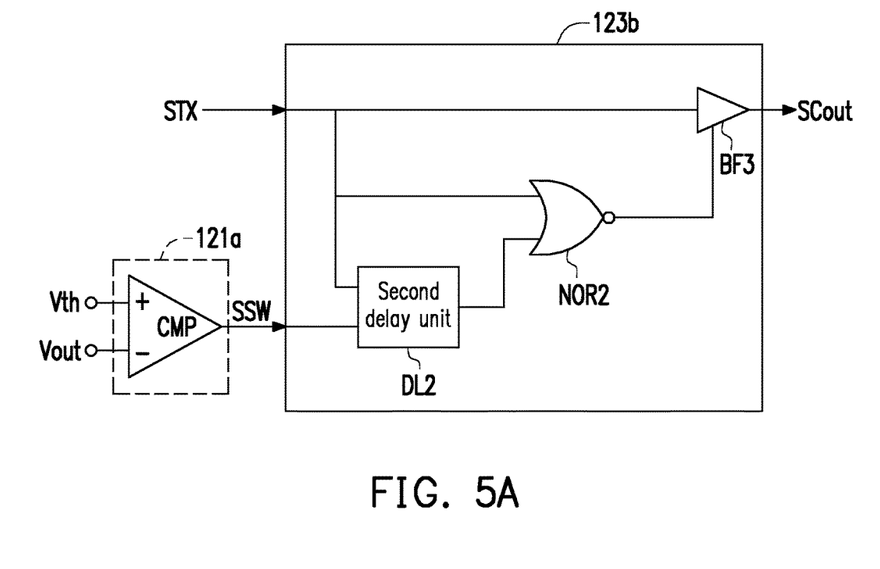
FIG. 5A is a schematic view illustrating a time signal control circuit according to an embodiment of the invention.

FIG. 5A is a schematic view illustrating a time signal control circuit according to an embodiment of the invention. Referring to FIGS. 2 and 5A, in the embodiment, the determination circuit 121a may be referred to the embodiment of FIG. 4, and a logic circuit 123b includes a buffer BF3, a delay unit DL2, and an NOR gate NOR2. An output end of the NOR gate NOR2 is coupled to an enabling end of the buffer BF3 to control whether the buffer BF3 is enabled or not. During a period when the buffer BF3 is enabled, the control signal SCout is in a tri-state between a high level and a low level. When the control signal Scout is in the tri-state, the upper bridge switch Q1 and the lower bridge switch Q2 are turned off. The logic circuit 123b provides the control signal SCout to the output stage 11 through the buffer BF3.

Figure 5B:
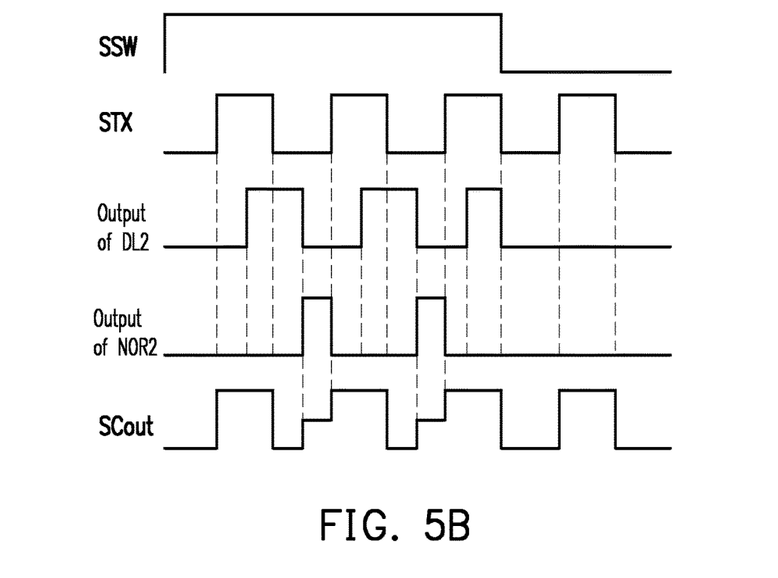
FIG. 5B is a waveform diagram of a time signal control circuit according to an embodiment of the invention.

FIG. 5B is a waveform diagram of a time signal control circuit according to an embodiment of the invention. Referring to FIGS. 5A and 5B, in a period of the initial mode, the switch signal SSW enables the delay unit DL2 to delay the time signal STX. During a period when the time signal STX is at a low level, the NOR gate NOR2 receives the time signal STX and the delayed time signal STX. When the time signal STX and the delayed time signal STX are at a low level, the buffer BF3 is enabled, and the control signal SCout is thus in the tri-state. During a period of the normal mode, the switch signal SSW disables the delay unit DL2. In other words, the NOR gate NOR2 only receives the time signal STX and a signal constant at a high level. Under the circumstance, the NOR gate NOR2 only transmits a high-level signal, so the buffer BF3 does not send a signal in the tri-state.

Figure 6A:
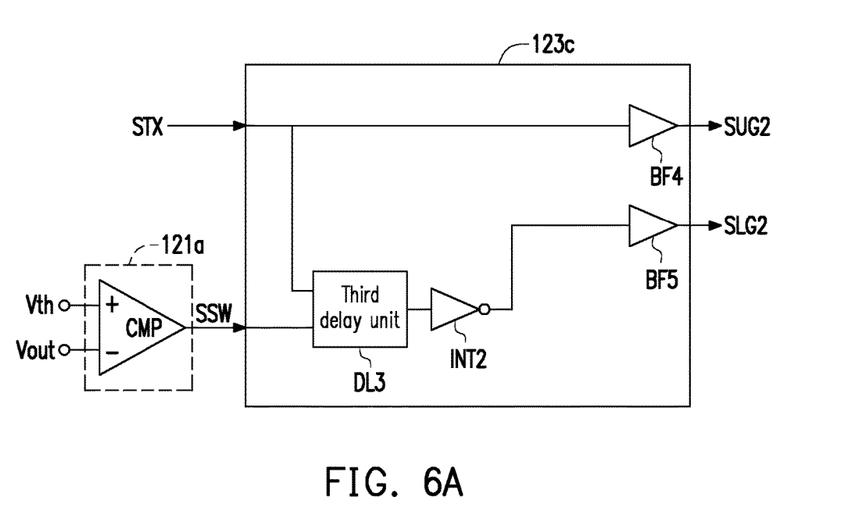
FIG. 6A is a schematic view illustrating a time signal control circuit according to an embodiment of the invention.

FIG. 6A is a schematic view illustrating a time signal control circuit according to an embodiment of the invention. Referring to FIGS. 2 and 6A, in the embodiment, the determination circuit 121a may be referred to the embodiment shown in FIG. 4, a logic circuit 123c includes a buffer BF4, a buffer BF5, a delay unit DL3, and an inverter INT2, and the upper bridge control signal SUG2 and the lower bridge control signal SLG2 are provided to the upper bridge switch Q1 and the lower bridge switch Q2 via the buffer BF4 and the buffer BF5.

Figure 6B:
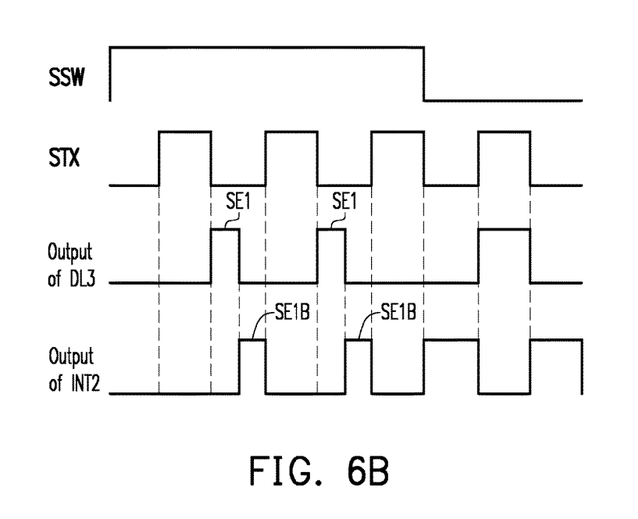
FIG. 6B is a waveform diagram of a time signal control circuit according to an embodiment of the invention.

FIG. 6B is a waveform diagram of a time signal control circuit according to an embodiment of the invention. Referring to FIGS. 6A and 6B, in a period of the initial mode, the switch signal SSW enables the delay unit DL3. When triggered by a trailing edge of the time signal STX, the delay unit DL3 may transmit a short turn-on signal SE1. During a period when the upper bridge control signal SUG2 is at a low level, the inverter INT1 inverts the turn-on signal SE1. The inverter INT2 receives the inverted turn-on signal SE1B and transmits the high-level lower bridge control signal SLG2. During a period of the normal mode, the switch signal SSW disables the delay unit DL3, and the time signal STX is directly sent to the inverter INT2 through the delay unit DL3 to generate the lower bridge control signal SLG2 inverted with respect to the time signal STX.

Figure 7A:
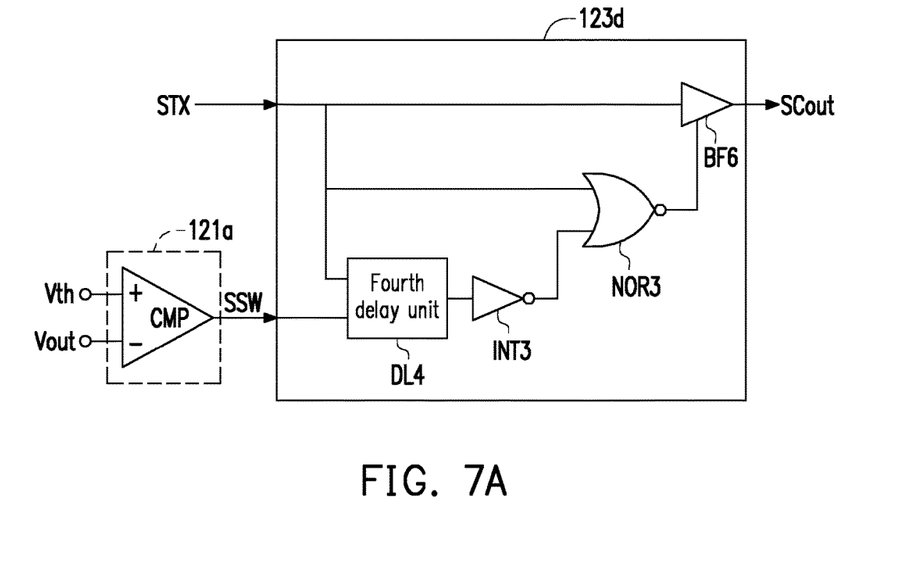
FIG. 7A is a schematic view illustrating a time signal control circuit according to another embodiment of the invention.

FIG. 7A is a schematic view illustrating a time signal control circuit according to another embodiment of the invention. Referring to FIGS. 2 and 7A, in the embodiment, the determination circuit 121a may be referred to the embodiment of FIG. 4, and the logic circuit 123d includes a buffer BF6, a delay unit DL4, an inverter INT3, and an NOR gate NOR3. An output end of the NOR gate NOR3 is coupled to an enabling end of the buffer BF6. The control signal Scout (such as a pulse-width modulation (PWM) signal) is provided to the output stage 11 through an output end of the buffer BF6.

Figure 7B:
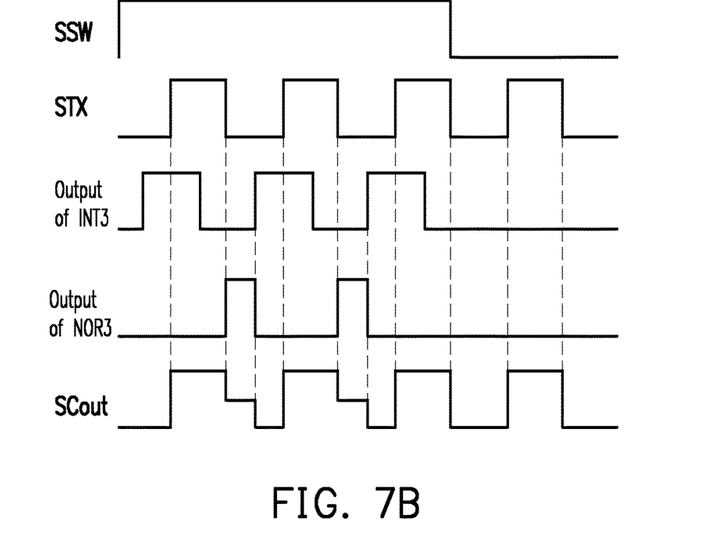
FIG. 7B is a waveform diagram of a time signal control circuit according to another embodiment of the invention.

FIG. 7B is a waveform diagram of a time signal control circuit according to another embodiment of the invention. Referring to FIGS. 7A and 7B, in a period of the initial mode, the switch signal SSW enables the delay unit DL4 to delay the time signal STX. During the period when the time signal STX is at a low level, the NOR gate NOR3 receives the time signal STX and the delayed and inverted time signal STX. When the time signal STX and the delayed and inverted time signal STX are at a low level, the buffer BF6 is enabled, and the control signal SCout is thus in the tri-state. During the normal mode, the switch signal SSW disables the delay unit DL2. In other words, the NOR gate NOR3 only receives the time signal STX and a signal constant at a high level. Under the circumstance, the NOR gate NOR3 only transmits a high-level signal, so the buffer BF6 does not send a signal in the tri-state.

Figure 8:
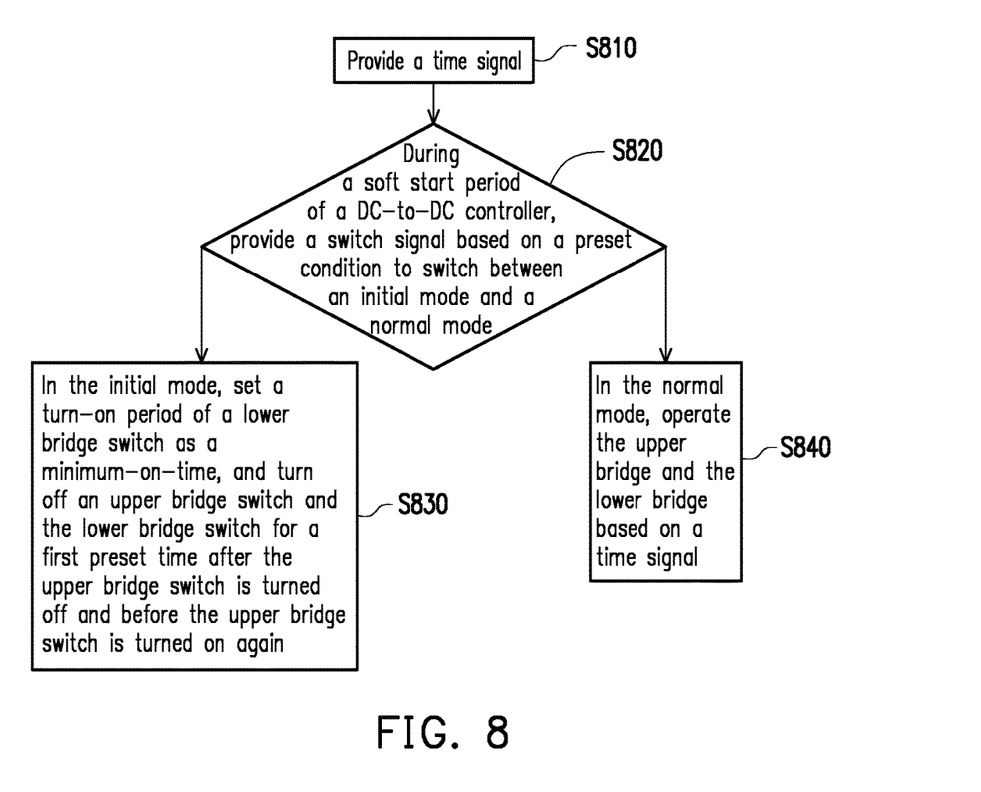
FIG. 8 is a flowchart illustrating a control method of a DC-to-DC controller according to an embodiment of the invention.

FIG. 8 is a flowchart illustrating a control method of a DC-to-DC controller according to an embodiment of the invention. Referring to FIG. 8, in the embodiment, a control method of a DC-to-DC controller includes steps as follows. At Step S810, a time signal is provided. At Step S820, a switch signal is provided based on a preset condition to switch between an initial mode and a normal mode during a soft start period of the DC-to-DC controller. At Step S830, in the initial mode, a turn-on period of the lower bridge switch is set as a minimum-on-time and the upper bridge switch and the lower bridge switch are turned off for the first preset time after the upper bridge switch is turned off and before the upper bridge switch is turned on again. At Step S840, in the normal mode, the upper bridge switch and the lower bridge switch operate based on the time signal. The order of Steps S810, S820, S830, and S840 is only described herein for an illustrative purpose, and the embodiments of the invention are not limited to the order. In addition, details of Steps S810, S820, S830, and S840 may be referred to the embodiments of FIGS. 2, 3A, 3B, 4A, 4B, 5A, 5B, 6A, 6B, 7A, and 7B, and shall not be repeated in the following.

In view of the foregoing, in the DC-to-DC controller and the control method thereof according to the embodiments of the invention, during the interval time between two adjacent turn-on periods of the upper bridge switch of the output stage, the lower bridge switch of the output stage is turned on at least once. Accordingly, voltage releasing of the output voltage is facilitated through the body diode of the lower bridge switch to prevent overshoot. In addition, during a short period of time when the lower bridge switch is turned on, over current protection is able to function normally to prevent the damage caused by an over current.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A DC-to-DC controller, coupled to an output stage providing an output voltage and comprising an upper bridge switch and a lower bridge switch, the DC-to-DC controller comprising:
   a time signal generating unit; and
   a time signal control circuit, coupled to the time signal generating unit and receiving a preset voltage and the output voltage,
   wherein during a soft start period, if the output voltage is lower than the preset voltage, after the upper bridge switch is turned off and before the upper bridge switch are turned on again, the time signal control circuit turns off the upper bridge switch and the lower bridge switch for a first preset time and turns on the lower bridge switch for a second preset time, wherein the second preset time is less than the first preset time,
   wherein immediately after the upper bridge switch is turned off, the lower bridge switch is turned on for the second preset time, and then the lower bridge switch is turned off for the first preset time.

2. The DC-to-DC controller of claim 1, wherein during the soft start period, if the output voltage is greater than the preset voltage, the time signal control circuit operates the upper bridge switch and the lower bridge switch normally.

3. The DC-to-DC controller of claim 1, wherein the second preset time is a minimum-on-time that the time signal generating unit is able to provide.

4. The DC-to-DC controller of claim 1, wherein the time signal control circuit comprises:
   a comparator, receiving the output voltage and the preset voltage to provide a switch signal; and
   a logic circuit, coupled to the time signal generating unit, the comparator, and the output stage to control the upper bridge switch and the lower bridge switch.

5. The DC-to-DC controller of claim 4, wherein the logic circuit comprises a timer, and when the upper bridge switch is turned off, the timer turns on the lower bridge switch after a dead time.

6. The DC-to-DC controller of claim 4, wherein the logic circuit comprises a timer, and when the lower bridge switch is turned off, the timer turns on the upper bridge switch after a dead time.

7. A DC-to-DC controller, coupled to an output stage providing an output voltage and comprising an upper bridge switch and a lower bridge switch, the DC-to-DC controller comprising:
   a time signal generating unit; and
   a time signal control circuit, coupled to the time signal generating unit and receiving a preset voltage and the output voltage,
   wherein during a soft start period, if the output voltage is lower than the preset voltage, the time signal control circuit controls the upper bridge switch and the lower bridge switch with a preset period of dead time during each operation cycle period, the lower bridge switch is turned on for a first preset time during each operation cycle, and
   during the each operation cycle period, each of the upper bridge switch and the lower bridge switch is turned on once,
   wherein the upper bridge switch and the lower bridge switch are both turned off during the dead time, and the dead time is greater than the first preset time,
   wherein immediately after the upper bridge switch is turned off, the lower bridge switch is turned on for the first preset time, and then the lower bridge switch is turned off for a second preset time, wherein the second preset time is less than the first preset time.

8. The DC-to-DC controller of claim 7, wherein during the soft start period, if the output voltage is greater than the preset voltage, the time signal control circuit operates the upper bridge switch and the lower bridge switch normally.

9. The DC-to-DC controller of claim 7, wherein the dead time is immediately after the upper bridge switch is turned off.

10. The DC-to-DC controller of claim 7, wherein the first preset time is a minimum-on-time that the time signal generating unit is able to provide.

11. The DC-to-DC controller of claim 7, wherein the dead time is immediately after the lower bridge switch is turned off.

12. The DC-to-DC controller of claim 7, wherein the time signal control circuit comprises:
a comparator, receiving the output voltage and the preset voltage to provide a switch signal; and
a logic circuit, coupled to the time signal generating unit, the comparator, and the output stage to control the upper bridge switch and the lower bridge switch.

13. A control method of a DC-to-DC controller for controlling an upper bridge switch and a lower bridge switch of an output stage, the control method comprising:
providing a time signal;
providing a switch signal based on a preset condition to switch between an initial mode and a normal mode during a soft start period of the DC-to-DC controller,
wherein in the initial mode, a turn-on period of the lower bridge switch is set as a minimum-on-time, and the upper bridge switch and the lower bridge switch are turned off for a first preset time after the upper bridge switch is turned off and before the upper bridge switch is turned on again, and the first preset time is greater than the minimum-on-time,
wherein in the normal mode, the upper bridge switch and the lower bridge switch operate based on the time signal,
wherein immediately after the upper bridge switch is turned off, the lower bridge switch is turned on for a second preset time, and then the lower bridge switch is turned off for the first preset time, wherein the second preset time is less than the first preset time.

14. The control method of claim 13, further comprising:
comparing an output voltage with a preset voltage to provide the switch signal.

15. The control method of claim 13, further comprising:
during the soft start period, if an output voltage is greater than a preset voltage, the upper bridge switch and the lower bridge switch are operated normally.

16. The control method of claim 13, further comprising:
turning on the lower bridge switch after a dead time when the upper bridge switch is turned off.

17. The control method of claim 13, further comprising:
turning on the upper bridge switch after a dead time when the lower bridge switch is turned off.

18. A DC-to-DC controller, coupled to an output stage providing an output voltage and comprising an upper bridge switch and a lower bridge switch, the DC-to-DC controller comprising:
a time signal generating unit; and
a time signal control circuit, coupled to the time signal generating unit and receiving a preset voltage and the output voltage,
wherein during a soft start period, if the output voltage is lower than the preset voltage, after the upper bridge switch is turned off and before the upper bridge switch is turned on again, the time signal control circuit turns off the upper bridge switch and the lower bridge switch for a first preset time and turns on the lower bridge switch for a second preset time, wherein the second preset time is less than the first preset time,
wherein immediately after the upper bridge switch is turned off, the lower bridge switch is turned off for the first preset time, and then the lower bridge switch is turned on for the second preset time.

* * * * *